United States Patent [19]

Herb et al.

[11] Patent Number: 4,560,311

[45] Date of Patent: Dec. 24, 1985

[54] EXPANSION DOWEL ASSEMBLY

[75] Inventors: Armin Herb, Peissenberg; Peter Froehlich, Neuried, both of Fed. Rep. of Germany

[73] Assignee: Hilti Aktiengesellschaft, Fürstentum, Liechtenstein

[21] Appl. No.: 559,204

[22] Filed: Dec. 8, 1983

[30] Foreign Application Priority Data

Dec. 14, 1983 [DE] Fed. Rep. of Germany ....... 3246275

[51] Int. Cl.⁴ .............................................. F16B 13/04
[52] U.S. Cl. ...................................... 411/44; 411/54; 411/55; 411/79
[58] Field of Search ..................... 411/44, 21, 54–62, 411/75–80, 446, 448

[56] References Cited

U.S. PATENT DOCUMENTS

| 1,251,566 | 1/1918 | Pigott | 411/78 |
| 3,460,429 | 8/1969 | La Torre | 411/56 |
| 3,566,739 | 3/1971 | Lebar |  |
| 4,427,327 | 1/1984 | Herb | 411/79 |

FOREIGN PATENT DOCUMENTS

| 2613495 | 10/1977 | Fed. Rep. of Germany | 411/55 |
| 2221267 | 1/1978 | Fed. Rep. of Germany | 411/55 |

*Primary Examiner*—Kenneth J. Dorner
*Assistant Examiner*—Neill Wilson
*Attorney, Agent, or Firm*—Toren, McGeady, Stanger et al.

[57] ABSTRACT

An expansion dowel assembly includes an axially extending dowel and an expansion member. In the expansion step the expansion member is axially displaced over a surface on the dowel providing form-locking engagement of the dowel assembly within a borehole. The surface on the dowel, over which the expansion member is displaced, is made up of two serially arranged axially extending surface sections. Each surface section is disposed at a different acute angle to the dowel axis.

4 Claims, 4 Drawing Figures

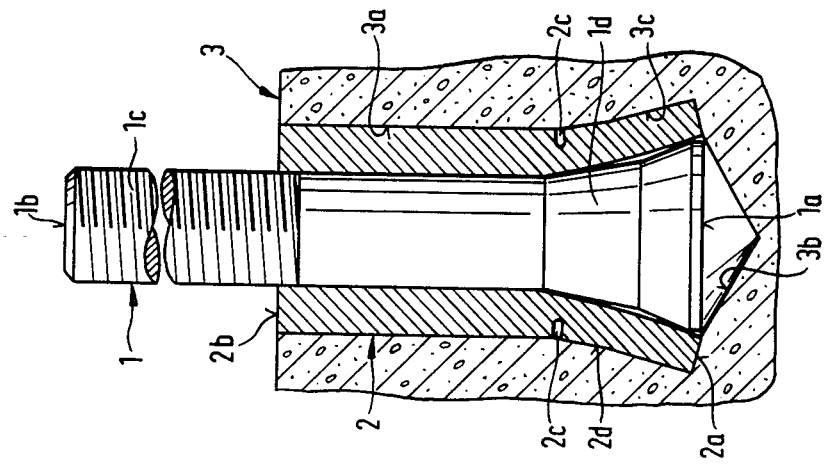
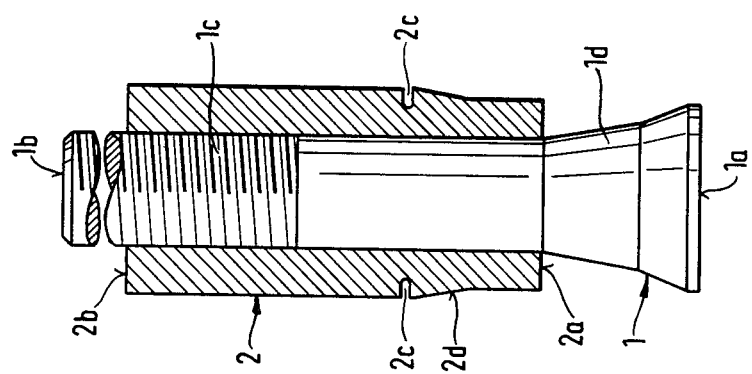

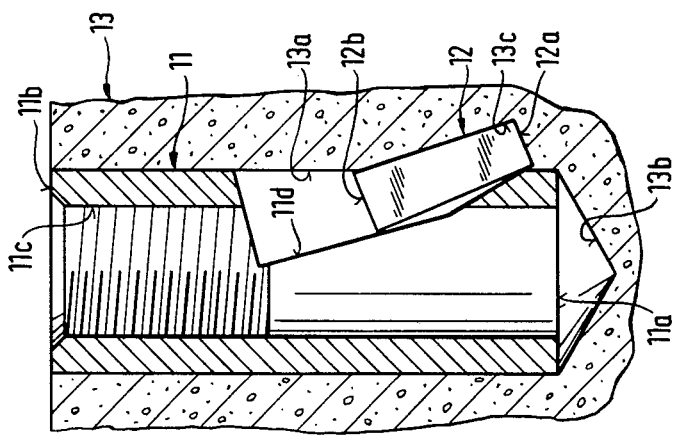
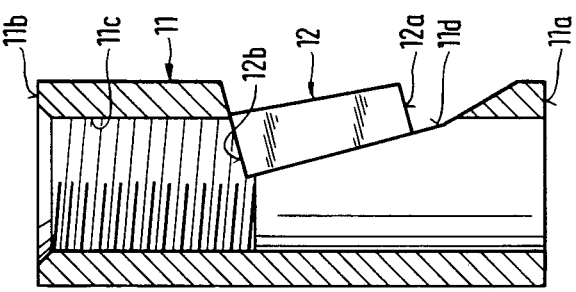

EXPANSION DOWEL ASSEMBLY

SUMMARY OF THE INVENTION

The present invention is directed to an expansion dowel assembly including a dowel with a thread for effecting a connection to the dowel, and an expansion member axially displaceable relative to the dowel.

In securing a member or part to a concrete structure or a similar receiving material, fastening members which can be secured in a form-locking manner have been used to an increasing degree at the present time along with fastening members which can be anchored only in a force-locking manner, that is, by friction. The fastening members secured in a form-locking manner are particularly useful when such members are exposed to alternating loads or vibration.

In principle, fastening members secured in a form-locking manner can be divided into two different types. In one type, an undercut is produced in a borehole in the receiving material using special tools. Subsequently, a fastening member adapted to such a specially formed bore is inserted and anchored in the undercut region of the bore in a form-locking manner using an expansion process. The special tool required for forming the undercut are usually very expensive and susceptible to damage.

In the second type, a borehole is formed by means of conventional tools without any undercut. Subsequently, a form-locking engagement is achieved by the fastening member itself. In this type of anchor, a dowel is usually inserted into the borehole until it contacts the base of the borehole. Usually, at least an axially portion of the dowel member has an enlarged cross-section at its leading end, that is, the end which contacts the base of the borehole. With the dowel in position, an expansion member is driven into the borehole over the enlarged part of the dowel and the dowel effects the form-locking engagement by displacing the material in which the borehole is formed by means of the expansion member. In this type of anchor no expansion pressure occurs. Therefore, when the dowel is loaded it experiences considerable initial slippage. Such slippage is manifested in that the dowel initially placed flush with the surface of the receiving material containing the borehole, projects partly out from the surface of the receiving material when it is loaded. Such a condition is visually disturbing and also results in technical disadvantages in that the member or part to be fastened to the receiving material can not be drawn against the material so that it is sufficiently flush.

Therefore, it is the primary object of the present invention to provide an expansion dowel assembly for effecting a form-locking anchoring within a borehole which is as free of slippage as is possible.

The present invention has the following characteristic features:

(a) The dowel member is arranged so that it has a step-like increase in cross-sectional area toward its leading end, and (b) The expansion member is shaped to provide an increase in cross-section in the direction from the leading end toward the trailing end.

Due to this combination of characteristic features, a form-locking engagement is afforded in the receiving material in which the expansion dowel assembly is located when the expansion member is driven in relative to the dowel. Due to the relationship between the enlargement of the expansion member and the dowel, a wedging action takes place when the expanion member is driven in so that expansion pressure is developed.

When the expansion dowel assembly is set and loaded, slippage relative to the borehole is kept to a negligible minimum due to the expansion pressure developed. The expansion pressure can be substantially less than in an expansion dowel which is anchored only by force-locking. Therefore, the expansion dowel assembly embodying the present invention can be employed in special applications, such as at a location spaced a slight distance from the edge of the structure where conventional expansion dowels can not be used because of the high expansion pressure involved. The enlargement of the dowel member which takes place in a stepwise manner in the insertion direction into a borehole or the like, also results in an increased resistance when the expansion member is driven in. Accordingly, it can be observed from the exterior when the necessary expansion has been achieved and when the insertion process has been completed.

The expansion member which enlarges in cross-section at least over a portion of the expansion member in the direction toward its trailing end, is secured against any automatic loosening effect due to the bracing action which results in the region of the undercut formed by the expansion member.

In principle, a partial enlargement of the expansion member is sufficient. For a uniform distribution of the expansion pressure it is advisable to construct the expansion member so that it increases in cross-section along its entire length. Further, the rigidity of the expansion member is improved by such an arrangement.

In a preferred embodiment of the expansion dowel incorporating the present invention, a portion of the dowel member is constructed as a truncated cone and the expansion member is in the shape of a sleeve laterally enclosing the truncated cone or axially extending frusto-conical section. The truncated cone or frusto-conical section is made up of at least two different axially extending sections each with a different cone angle or angle of the surface relative to the axis of the dowel. To improve the expanding character of the expansion member when it is formed as a sleeve, the expansion member can have one or more longitudinal slots extending for at least a portion of its length. To simplify the insertion process, the expansion member can be provided at its trailing end with a shoulder formed monolithically with the rest of the expansion member.

Another preferred embodiment of the expansion dowel incorporating the present invention has the dowel in the form of a sleeve with a wedge-shaped recess or cutout and with the expansion member shaped to be at least partially wedge-shaped. Such an embodiment is particularly advantageous if a female thread is formed in the sleeve-like dowel with the thread forming a connection means for a member secured to the dowel. The sleeve-like dowel can be open at its leading end or closed to prevent the penetration of borings dust or the like. During the insertion operation, the wedge-shaped expansion member can be driven into the wall of the borehole surrounding the dowel by means of a placing tool inserted through the sleeve-like dowel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a cross-sectional view of an expansion dowel assembly embodying the present invention and including a dowel with a frusto conical section and an expansion member in the form of a sleeve, with the assembly shown in the unexpanded state;

FIG. 2 is a sectional view of the expansion dowel assembly illustrated in FIG. 1, however, shown in the expanded or anchored state;

FIG. 3 is another embodiment of an expansion dowel assembly incorporating the present invention and including a sleeve-like dowel and a wedge-shaped expansion member, shown in the unexpanded state; and FIG. 4 is a sectional view of the expansion dowel assembly illustrated in FIG. 3 and shown in the expanded or anchored state.

DETAILED DESCRIPTION OF THE INVENTION

In FIGS. 1 and 2 an expansion dowel assembly is shown made up of a bolt-like dowel 1 and a sleeve-like expansion member laterally enclosing an axial portion of the dowel. As can be seen in FIG. 2, the lower end of the dowel 1 is its leading end 1a, that is, the end first inserted into the receiving material 3. The opposite end of the dowel is its trailing end 1b. The exterior surface of the dowel extending from its trailing end 1b has a thread 1c. The axially extending region of the dowel 1 extending from its leading end 1a has a frusto-conical section 1d. The frusto-conical section 1d is made up of two axially extending sections each having a different cone angle that is, the surface forms an acute angle with the axis of the dowel. The cone angle of the frusto-conical section closer to the leading end 1a is greater than the cone angle of the frusto-conical section more remote from the leading end. The inside diameter of the expansion member 2 corresponds substantially to the outside diameter of the cylindrical portion of the dowel member extending from the frusto-conical section 1d to the trailing end 1b. The expansion member 2 also has a leading end 2a which is inserted first into the receiving material and trailing end 2b and it is divided into two axially extending regions by an annular recess 2c. The outside surface of the sleeve-like expansion member 2 has a reduced diameter axially extending cylindrical section extending from the leading end 2a to an axially extending frusto-conical section 2d with the remainder of the expansion member having a larger outside diameter cylindrical section extending from the section 2d to the trailing end 2b. Note the recess 2c is located at the juncture of the frusto-conical section 2d and the larger diameter cylindrical section.

In FIG. 2 the expansion dowel assembly is anchored in the receiving material 3. Initially, the dowel 1 is inserted into a borehole 3 until its leading end 1a contacts the bottom 3b of the borehole. The sleeve-like expansion member laterally surrounding the cylindrically shaped portion of the dowel 1 is then driven forwardly over the dowel toward the bottom 3b of the borehole 3a. As a result, as the expansion member 2 moves over the frusto-conical section 1d, it is forced outwardly and penetrates into the wall of the borehole 3a and produces an undercut 3c affording form-locking engagement of the expansion dowel assembly with the receiving material 3. The depth of the borehole 3a and the axial length of the expansion member 2 are adapted to one another so that the assembly, when fully inserted, has the trailing end 2b of the expansion member 2 flush with the outside surface of the receiving material 3. The step-like enlargement formed by the frusto-conical section 1d of the dowel member 1 in the direction toward its leading end 1a as well as the frusto-conical section 2d of the expansion member 2 which enlarges in the direction toward the trailing end 2b, effects a wedging of the expansion dowel assembly within the borehole in the receiving material so that any possible play is eliminated and slippage does not occur when the dowel 1 is loaded.

The second embodiment illustrated in FIGS. 3 and 4 corresponds functionally to the embodiment displayed in FIGS. 1 and 2. This second embodiment of the expansion dowel assembly is made up of a sleeve-like dowel 11 and an expansion member 12 in the form of a wedge. Dowel 11 has a leading end 11a and a trailing end 11b. The bore formed by the sleeve-like dowel member 11 has an interior or female thread 11c extending for a portion of its axial length from the trailing end 11b of the dowel. Further, intermediate its leading and trailing ends and closer to the leading end a wedge-shaped recess 11d is formed in the dowel member 11. The recess 11d forms a contact surface for the expansion member 12. Similar to the frusto-conical section 1d of the dowel shown in FIG. 1, the contact surface defining the inner surface of the recess 11d is arranged in a stepwise manner, that is, it has two axially extending surface sections each disposed at an acute angle to the axis of the sleeve-like dowel with the surface section closer to the leading end of the dowel forming a larger angle than the surface section closer to the trailing end. The expansion member 12 increases in cross-sectional area from its leading end 12a to its trailing end 12b, that is, it increases over the axially extending length of the expansion member. The expansion member 12 can be detachably connected with the dowel 11 by cementing, soldering or adhesive tape.

In FIG. 4, the dowel assembly is shown in the anchored position within a borehole 13a in a receiving material 13. Initially, the dowel 11 is inserted into the borehole 13a until its leading end 11a contacts the bottom 13b of the borehole. Next, the expansion member is driven forwardly, that is, toward the leading end of the dowel 11, by a pin-like placing member so that the expansion member is driven in the axial direction of the dowel over the step-like surfaces in the bottom of the recess 11d. Due to the wedge-shaped bottom formed by the recess 11d, the expansion member moves both axially and radially outwardly into the wall surface of the borehole 13a and forms an undercut 13c. Due to the wedge-shaped arrangement of the expansion member 12 and the step-like base surface of the recess 11d a bracing action is afforded so that any possible play of the dowel assembly and the borehole in the receiving material is eliminated and a slippage-free anchoring of the dowel assembly is obtained.

While specific embodiments of the invention have been shown and described in detail to illustrate the application of the inventive principles, it will be understood that the invention may be embodied otherwise without departing from such principles.

We claim:

1. Expansion dowel assembly for insertion into a borehole or similar opening, comprising an axially elongated dowel having a leading end and a trailing end spaced apart in the axial direction with the leading end adapted to be inserted first into the borehole, connecting means for making a connection to said dowel, an expansion member disposed in surface contact with said dowel and arranged to be displaced in the axial direction of said dowel relative to said dowel, wherein the improvement comprises that said dowel has an axially extending surface thereon arranged for sliding contact with said expansion member so that the axial movement of said expansion member on said surface effects the displacement of said expansion member into an expanded position of said dowel assembly, said surface on said dowel having a first axially extending section with a first end closer to said trailing end and a second end closer to said leading end, and a second axially extending section with a first end adjoining the second end of said first axially extending section and a second end located closer to said leading end of said dowel, said first and second axially extending sections disposed at an acute angle to the axis of said dowel with said second axially extending section forming a larger angle than said first axially extending section, said expansion member is formed with an increasing cross-section from its leading end to its trailing end, said dowel has an axially extending frusto-conical section adjacent the leading end thereof with said frusto-conical section forming said first and second axially extending sections of said axially extending surface, said dowel includes an axially extending cylindrically shaped section extending from said frusto-conical section toward the trailing end of said dowel, said expansion member comprises a sleeve encircling said cylindrically shaped section when said dowel assembly is inserted into a borehole and said sleeve being axially displaceable over said frusto-conical section when said dowel assembly is placed into the expanded position, said sleeve forming said expansion member has a leading end and a trailing end spaced axially apart and in the assembled position of said expansion member on said dowel said leading end of said expansion member is closer to the leading end of said dowel and the trailing end of said expansion member is closer to the trailing end of said dowel, said sleeve has an axially extending cylindrically shaped smaller diameter outside surface extending from said leading end than the diameter of the cylindrically shaped outside surface of said sleeve extending from said trailing end, an axially extending transition surface on the outside surface of said sleeve extending between the smaller diameter leading end outside surface to the larger diameter trailing end outside surface, and the larger diameter trailing end outside surface being at least equal to the diameter of the leading end of said dowel with the inside surface of said sleeve being cylindrically shaped between the leading end and trailing end thereof with an inside diameter corresponding to said cylindrically shaped section of said dowel so that said dowel assembly can be inserted into a borehole with the leading end of said dowel contacting the base of the borehole whereby said sleeve can be driven toward the leading end of said dowel over said frusto-conical section of said dowel into radially expanded engagement with the surface of said borehole.

2. Expansion dowel assembly, as set forth in claim 1, wherein the transition surface of said sleeve is frusto-conically shaped extending between the smaller diameter outside surface and the larger diameter outside surface of said sleeve.

3. Expansion dowel assembly, as set forth in claim 2, wherein an annular groove is formed in the outside surface of said sleeve at the juncture between the larger diameter outside surface of said sleeve and the larger diameter end of said frusto-conically shaped transistion surface.

4. Expansion dowel assembly, as set forth in claim 1, wherein said connecting means comprises a thread formed on the outside surface of said dowel and extending from the trailing end thereof toward the leading end.

* * * * *